United States Patent
Chen et al.

(10) Patent No.: US 12,415,952 B2
(45) Date of Patent: Sep. 16, 2025

(54) CARBON NANODOT-POLYACRYLIC ACID COMPOSITE HYDROGEL, AND METHOD FOR PREPARING AND FORMULATION FOR FORMING THE SAME

(71) Applicant: Southern Taiwan University of Science and Technology, Tainan (TW)

(72) Inventors: Wei-Yu Chen, Tainan (TW); Cheng-Ho Chen, Tainan (TW); En-Yu Zhou, Tainan (TW); Hui-Shan Chang, Tainan (TW); Chao-Wei Huang, Tainan (TW); Han-Yi Chou, Tainan (TW); Yueh Yang, Tainan (TW); Guan-Zhu Zhu, Tainan (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 693 days.

(21) Appl. No.: 17/881,266

(22) Filed: Aug. 4, 2022

(65) Prior Publication Data

US 2023/0109313 A1    Apr. 6, 2023

(30) Foreign Application Priority Data

Sep. 24, 2021  (TW) ................ 110135661

(51) Int. Cl.
| | | |
|---|---|---|
| *C09K 11/65* | (2006.01) |
| *B82Y 20/00* | (2011.01) |
| *B82Y 30/00* | (2011.01) |
| *B82Y 40/00* | (2011.01) |
| *C08F 120/06* | (2006.01) |
| *C08G 73/02* | (2006.01) |
| *C08K 3/24* | (2006.01) |

(52) U.S. Cl.
CPC ............ *C09K 11/65* (2013.01); *C08F 120/06* (2013.01); *C08G 73/0206* (2013.01); *C08K 3/24* (2013.01); *B82Y 20/00* (2013.01); *B82Y 30/00* (2013.01); *B82Y 40/00* (2013.01); *C08K 2201/011* (2013.01)

(58) Field of Classification Search
CPC ................................. C09K 11/02; C09K 11/65
See application file for complete search history.

(56) References Cited

PUBLICATIONS

Li et al, "Carbon Dot/Poly(methylacrylic acid) Nanocomposite Hydrogels with High Toughness and Strong Fluorescence", ACS Applied Polymer Materials, 2020, 2(3), 1043-1052, Dec. 3, 2019.*

* cited by examiner

*Primary Examiner* — C Melissa Koslow
(74) *Attorney, Agent, or Firm* — MUNCY, GEISSLER, OLDS & LOWE, P.C.

(57) ABSTRACT

Disclosed herein is a carbon nanodot-polyacrylic acid composite hydrogel including a polyacrylic acid-based gel matrix having carboxyl groups, and a plurality of fluorescent carbon nanodots having amino groups on surfaces thereof. The fluorescent carbon nanodots are formed by subjecting polyethylenimine and hydrochloric acid to a hydrothermal reaction, and are distributed in the polyacrylic acid-based gel matrix. The amino groups of the fluorescent carbon nanodots are covalently bonded with the carboxyl groups of the polyacrylic acid-based gel matrix. Also disclosed herein are a method for preparing and a formulation for forming a carbon nanodot-polyacrylic acid composite hydrogel.

9 Claims, 3 Drawing Sheets

CARBON NANODOT-POLYACRYLIC ACID COMPOSITE HYDROGEL, AND METHOD FOR PREPARING AND FORMULATION FOR FORMING THE SAME

CROSS-REFERENCE TO RELATED APPLICATION

This application claims priority of Taiwanese Invention Patent Application No. 110135661, filed on Sep. 24, 2021.

FIELD

The present disclosure relates to a composite hydrogel, and more particularly to a carbon nanodot-polyacrylic acid composite hydrogel. The present disclosure also relates to a method for preparing and a formulation for forming the carbon nanodot-polyacrylic acid composite hydrogel.

BACKGROUND

Li, C. Y. et al. (2020), *ACS Appl. Polym. Mater.*, 2(3): 1043-1052 reported a fluorescent hydrogel which included a cross-linked poly(methylacrylic acid) gel matrix, and a plurality of fluorescent carbon dots having amino groups and carboxyl groups on surfaces thereof. The cross-linked poly (methylacrylic acid) gel matrix was obtained by subjecting a mixture including methacrylic acid and N,N'-methylenebis (acrylamide) to a free-radical reaction at room temperature for 24 hours. The fluorescent carbon dots were formed by subjecting another mixture including water, ethylenediamine and citric acid to a hydrothermal reaction at 200° C. for 5 hours.

In spite of the aforesaid, there is still a need to develop a new fluorescent hydrogel with improved properties for wider applications.

SUMMARY

Therefore, in a first aspect, the present disclosure provides a carbon nanodot-polyacrylic acid composite hydrogel which can alleviate at least one of the drawbacks of the prior art. The carbon nanodot-polyacrylic acid composite hydrogel includes a polyacrylic acid-based gel matrix having carboxyl groups, and a plurality of fluorescent carbon nanodots having amino groups on surfaces thereof. The fluorescent carbon nanodots are formed by subjecting polyethylenimine and hydrochloric acid to a hydrothermal reaction, and are distributed in the polyacrylic acid-based gel matrix. The amino groups of the fluorescent carbon nanodots are covalently bonded with the carboxyl groups of the polyacrylic acid-based gel matrix.

In a second aspect, the present disclosure provides a method for preparing a carbon nanodot-polyacrylic acid composite hydrogel, which can alleviate at least one of the drawbacks of the prior art. The method includes mixing a plurality of fluorescent carbon nanodots having positively charged amino groups on surfaces thereof with acrylic acid and an initiator so as to form a hydrogel-forming mixture, and subjecting the hydrogel-forming mixture to a polymerization reaction. The fluorescent carbon nanodots are formed by subjecting polyethylenimine and hydrochloric acid to a hydrothermal reaction.

In a third aspect, the present disclosure provides a formulation for forming a carbon nanodot-polyacrylic acid composite hydrogel, which can alleviate at least one of the drawbacks of the prior art, and which includes the above-mentioned fluorescent carbon nanodots having positively charged amino groups on surfaces thereof, acrylic acid, and an initiator.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
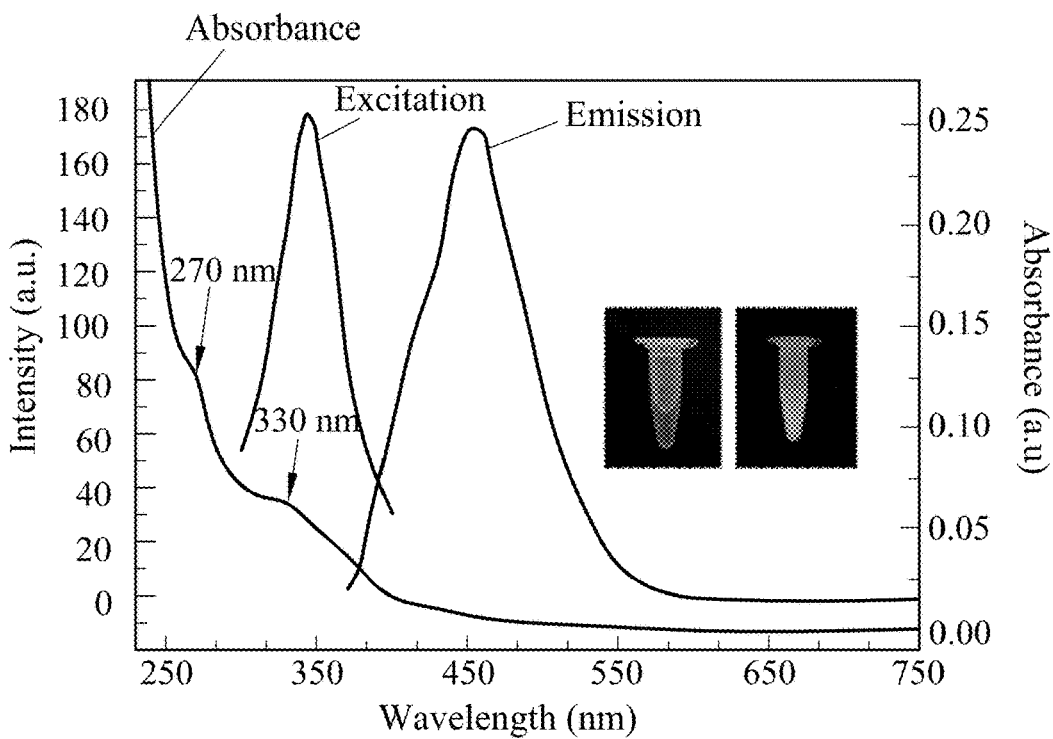
FIGS. 1 and 2 are graphs showing the optical properties of fluorescent carbon nanodots having positively charged amino groups on surfaces thereof for preparing a carbon nanodot-polyacrylic acid composite hydrogel of the present disclosure.

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a carbon nanodot-polyacrylic acid composite hydrogel including a polyacrylic acid-based gel matrix having carboxyl groups, and a plurality of fluorescent carbon nanodots having amino groups on surfaces thereof. The fluorescent carbon nanodots have no carboxyl groups on the surfaces thereof.

In certain embodiments, the polyacrylic acid-based gel matrix is formed by subjecting acrylic acid and an initiator to a polymerization reaction which is performed at a temperature ranging from 25° C. to 60° C. for a time period ranging from 5 minutes to 2 hours. Apart from the acrylic acid and the initiator, suitable reactants, additives, and/or catalysts may be additionally added to conduct the polymerization reaction. For instance, a phosphate buffer solution may be used to stabilize the overall pH during the polymerization reaction, such that the overall pH can be kept at the pH of the acrylic acid. In certain embodiments, the phosphate buffer solution includes water, phosphoric acid and phosphate salts. Since the suitable reactants, additives, and/ or catalysts additionally for the polymerization reaction are within the expertise and routine skills of those skilled in the art, further details are omitted herein for the sake of brevity.

An example of the initiator may include, but is not limited to, ammonium persulfate. In order to reduce the possibility that the initiator might be inactivated in an acidic environment during the polymerization reaction, an auxiliary agent may be used. An example of the auxiliary agent may include, but is not limited to, tetramethylethylenediamine.

According to the present disclosure, the fluorescent carbon nanodots are distributed in the polyacrylic acid-based gel matrix, and are formed by subjecting polyethylenimine and hydrochloric acid to a hydrothermal reaction (however, it should be noted that the fluorescent carbon nanodots, after being formed by such hydrothermal reaction and before being used to prepare the composite hydrogel, have positively charged amino groups). The amino groups of the fluorescent carbon nanodots are covalently bonded with the carboxyl groups of the polyacrylic acid-based gel matrix (namely, the fluorescent carbon nanodots, after being used to prepare the composite hydrogel, have amino groups covalently bonded to the carboxyl groups of the polyacrylic acid-based gel matrix). In certain embodiments, the hydrothermal reaction is performed at a temperature ranging from 220° C. to 260° C. for a time period ranging from 8 hours to 12 hours.

In certain embodiments, the fluorescent carbon nanodots are present in an amount ranging from 2 wt % to 3 wt % based on a total weight (i.e., 100 wt %) of the carbon nanodot-polyacrylic acid composite hydrogel, so that the carbon nanodot-polyacrylic acid composite hydrogel is conferred with an improved self-healing ability.

The present disclosure also provides a method for preparing the aforesaid carbon nanodot-polyacrylic acid composite hydrogel, which includes the following steps.

A plurality of fluorescent carbon nanodots having positively charged amino groups on surfaces thereof are mixed with acrylic acid and an initiator so as to form a hydrogel-forming mixture. The fluorescent carbon nanodots having positively charged amino groups on surfaces thereof are formed by mixing polyethyleneimine, hydrochloric acid and water to form a carbon nanodot-forming mixture, and by subsequently subjecting the carbon nanodot-forming mixture to a hydrothermal reaction. The hydrothermal reaction is as described above.

The hydrogel-forming mixture is subjected to a polymerization reaction. In the polymerization reaction, the fluorescent carbon nanodots having positively charged amino groups on surfaces thereof serve as a cross-linking agent to facilitate formation of the carbon nanodot-polyacrylic acid composite hydrogel. The polymerization reaction is as described above.

The present disclosure will be further described by way of the following examples. However, it should be understood that the following examples are intended solely for the purpose of illustration and should not be construed as limiting the present disclosure in practice.

PREPARATION OF EXAMPLES AND COMPARATIVE EXAMPLES

Example 1 (EX1)

4 g of polyethyleneimine (Manufacturer: Sigma-Aldrich; average weight molecular weight: 750 kDa) was mixed with 6 mL of an aqueous hydrochloric acid solution (containing hydrochloric acid and water; having a hydrochloric acid concentration of 1 wt % and a pH value of 0.5) to obtain a carbon nanodot-forming mixture. The carbon nanodot-forming mixture was subjected to a hydrothermal reaction at 220° C. for 8 hours so as to form a suspension containing fluorescent carbon nanodots having positively charged amino groups on surfaces thereof. Next, the suspension was subjected to a filtration treatment using a polyvinylidene fluoride (PVDF) membrane having a pore size of 0.22 µm so as to obtain a filtrate. Then, the filtrate was subjected to a centrifugation treatment at a relative centrifugal force of 5000 g for 30 minutes so as to remove impurities and to collect the fluorescent carbon nanodots having positively charged amino groups on surfaces thereof in an amount of 10 wt % based on a total weight of the centrifugated filtrate, followed by storing in an environment protected from light at 4° C.

Subsequently, 4000 µL of the centrifugated filtrate containing the fluorescent carbon nanodots was mixed with 500 µL of a phosphate buffer solution (containing water, phosphoric acid and phosphate salts; having a phosphoric acid concentration of 200 mM), 1500 µL of acrylic acid solution (having an acrylic acid concentration of 99 wt %), 1000 µL of an ammonium persulfate solution (containing water and ammonium persulfate; having an ammonium persulfate concentration of 2 wt %), 500 µL of a tetramethylethylenediamine solution (containing water and tetramethylethylenediamine; having a tetramethylethylenediamine concentration of 1 wt %), and 4500 µL of water to form a hydrogel-forming mixture. Then, the hydrogel-forming mixture was subjected to a polymerization reaction at 37° C. for 1 hour, so as to form a carbon nanodot-polyacrylic acid composite hydrogel. The fluorescent carbon nanodots, which had amino groups covalently bonded to carboxyl groups of polyacrylic acid after the polymerization reaction, were present in an amount of 1 wt % based on a total weight (i.e., 100 wt %) of the carbon nanodot-polyacrylic acid composite hydrogel.

Examples 2 and 3 (EX2 and EX3)

The procedure for preparing the carbon nanodot-polyacrylic acid composite hydrogel of each of EX2 and EX3 was similar to that for EX1, except that in preparing EX2 and EX3, the fluorescent carbon nanodots, which had amino groups covalently bonded to carboxyl groups of polyacrylic acid after the polymerization reaction, were present in an amount of 2 wt % and an amount of 3 wt %, respectively, based on the total weight of the carbon nanodot-polyacrylic acid composite hydrogel.

Comparative Example 1 (CE1)

A suspension containing carbon nanodots having amino groups and carboxyl groups on surfaces thereof was formed according to the preparation procedure and condition disclosed in section 2.2 of Li, C. Y. et al. (2020), *ACS Appl. Polym. Mater.*, 2(3):1043-1052.

2000 µL of the aforesaid suspension containing the carbon nanodots was mixed with 500 µL of a phosphate buffer solution (containing water, phosphoric acid and phosphate salts; having a phosphoric acid concentration of 200 mM), 1500 µL of acrylic acid solution (containing an acrylic acid in an amount of 99.5 wt % and water in an amount of <0.1 wt %), 1000 µL of ammonium persulfate solution (containing water and ammonium persulfate; having an ammonium persulfate concentration of 2 wt %), 500 µL of a tetramethylethylenediamine solution (containing water and tetramethylethylenediamine; having a tetramethylethylenediamine concentration of 1 wt %), and 4500 µL of water to form a product-forming mixture. The product-forming mixture was then subjected to a polymerization reaction at 37° C. for 1 hour, thereby obtaining an aqueous solution of carbon nanodots.

Comparative Example 2 (CE2)

To prepare CE2, the preparation procedure and condition described in EX1 were generally utilized, except for the following difference. The product-forming mixture was formed by mixing the phosphate buffer solution, acrylic acid, ammonium persulfate solution, tetramethylethylenediamine solution and water in the absence of the centrifugated filtrate containing the fluorescent carbon nanodots having positively charged amino groups on surfaces thereof, such that after the polymerization reaction, a liquid polyacrylic acid material was obtained.

Characteristic Evaluation

1. Determination of Optical Properties

Figure 2:
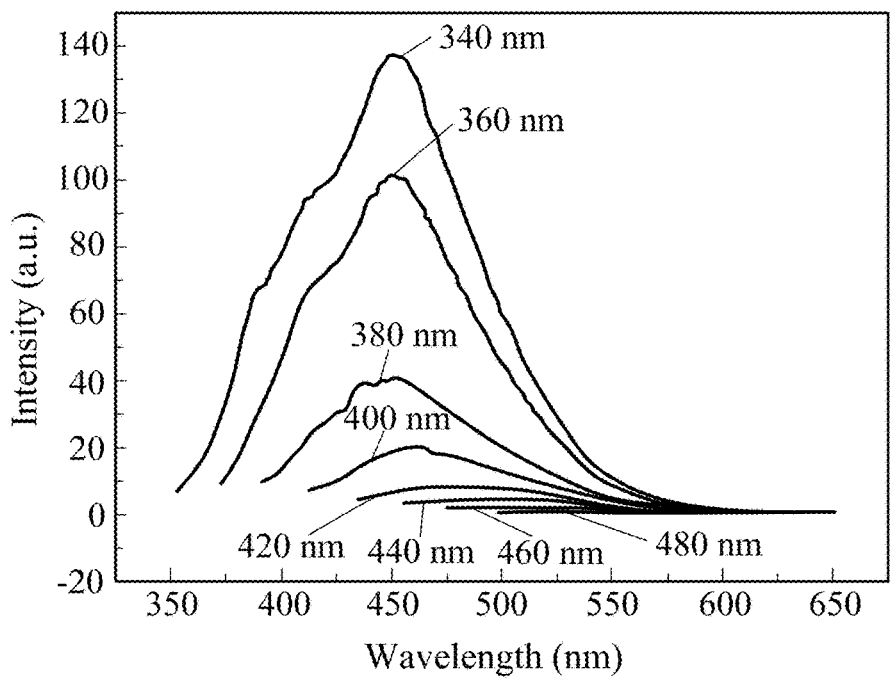

The optical properties of the fluorescent carbon nanodots having positively charged amino groups on surfaces thereof for preparing the carbon nanodot-polyacrylic acid composite hydrogel of EX1 were determined using a fluorescence spectrometer (Manufacturer: PerkinElmer, Inc.; Model no.: LS-55), and the results are shown in FIGS. 1 and 2.

2. Content Analysis

Figure 3:
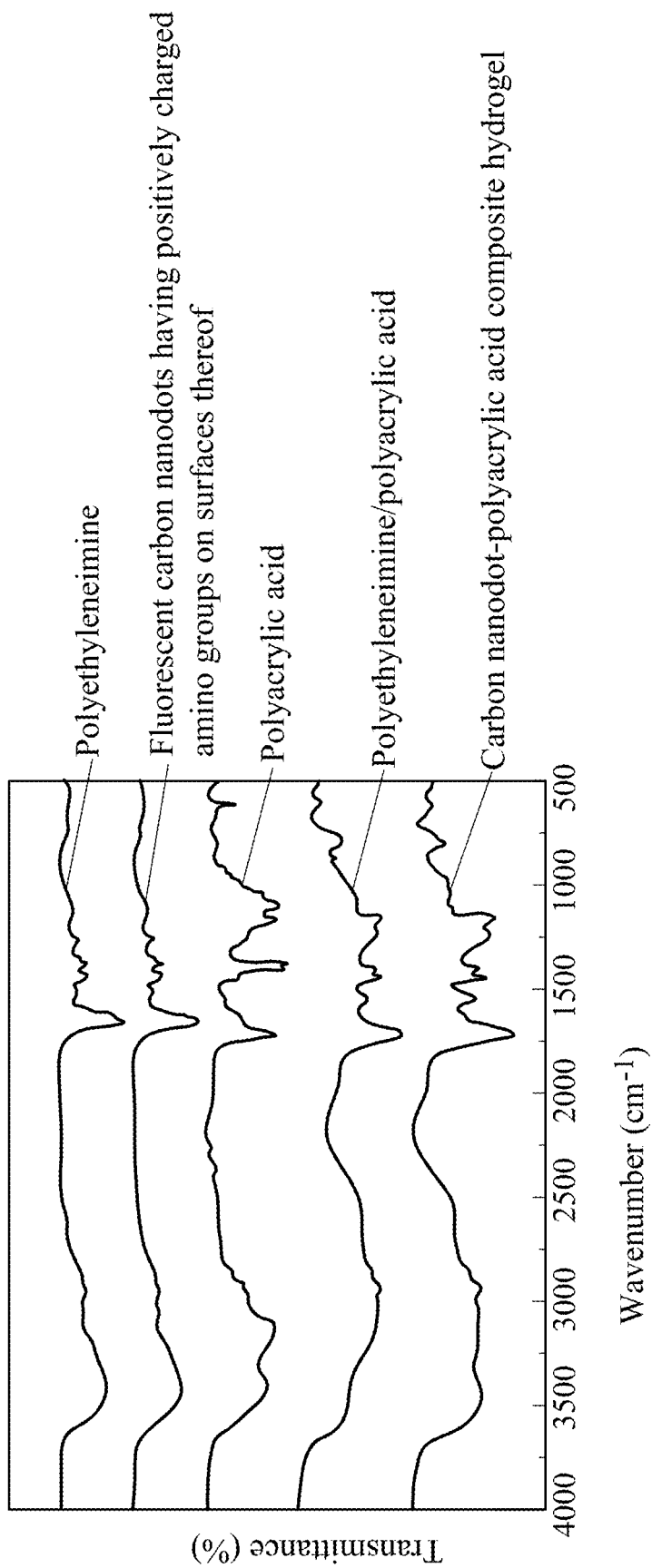
FIG. 3 shows an infrared spectra of the carbon nanodot-polyacrylic acid composite hydrogel of the present disclosure, the fluorescent carbon nanodots having positively charged amino groups on surfaces thereof for preparing the same, a polyethyleneimine standard, a polyacrylic acid standard, and a polyethyleneimine/polyacrylic acid standard.

The fluorescent carbon nanodots having positively charged amino groups on surfaces thereof for preparing the carbon nanodot-polyacrylic acid composite hydrogel of EX1 were subjected to Fourier-transform infrared spectroscopy (FTIR) using FT-IR spectrometer Frontier™ (Manufacturer: PerkinElmer, Inc.). In addition, the carbon nanodot-polyacrylic acid composite hydrogel of EX1, a polyethyleneimine standard, a polyacrylic acid standard, and a polyethyleneimine/polyacrylic acid standard were likewise subjected to FTIR using the aforesaid instrument. The results are shown in FIG. 3.

3. Determination of Surface Morphology

Figure 4:
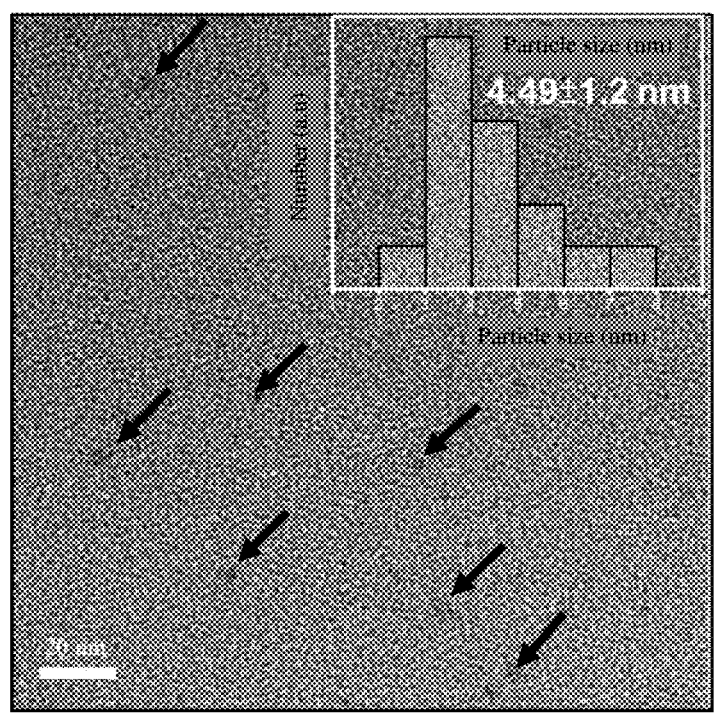
FIG. 4 is a high-resolution transmission electron microscopy (HRTEM) image showing the surface morphology of the fluorescent carbon nanodots having positively charged amino groups on surfaces thereof.

The surface morphology of the carbon nanodot-polyacrylic acid composite hydrogel of EX1 was determined using a high-resolution transmission electron microscope (HRTEM) (Manufacturer: FEI Company; Model no.: Philips Tecnai G2 F20 FEG-STEM), and the results are shown in FIG. 4.

4. Measurement of Zeta Potential

Five centrifugated filtrates, which contained fluorescent carbon nanodots having positively charged amino groups on surfaces thereof and were formed using carbon nanodot-forming mixtures having different pH values, were prepared as follows. 4 g of polyethyleneimine (Manufacturer: Sigma-Aldrich; average weight molecular weight: 750 kDa) was mixed with a hydrochloric acid solution (containing hydrochloric acid and water; having a hydrochloric acid concentration of 1 wt % and a pH value of 0.5) and a corresponding amount of a phosphate buffer solution (including phosphoric acid, phosphate ions, and water) so as to obtain a carbon nanodot-forming mixture having a corresponding pH value. Next, the carbon nanodot-forming mixture was subjected to a hydrothermal reaction at 220° C. for 8 hours so as to form a suspension containing fluorescent carbon nanodots having positively charged amino groups on surfaces thereof. Then, the suspension was subjected to a filtration treatment using a PVDF membrane having a pore size of 0.22 μm so as to obtain a filtrate. After that, the filtrate was subjected to a centrifugation treatment at a relative centrifugal force of 5000 g for 30 minutes so as to obtain a centrifugated filtrate containing the fluorescent carbon nanodots which was collected and stored in an environment protected from light at 4° C., and was then subjected to particle size and zeta potential measurement using a particle size and zeta potential analyzer (Manufacturer: Malvern Panalytical Ltd.; Model no.: Zetasizer Nano ZS9). The results are shown in Table 1 below.

Results

FIGS. 1 and 2 illustrate fluorescence spectra of the fluorescent carbon nanodots having positively charged amino groups on surfaces thereof for preparing the carbon nanodot-polyacrylic acid composite hydrogel of EX1. As shown in FIGS. 1 and 2, the fluorescent carbon nanodots having positively charged amino groups on surfaces thereof emitted a fluorescence light with a wavelength of 465 nm after being excited by a light with a wavelength of 340 nm. In addition, the fluorescent carbon nanodots having positively charged amino groups on surfaces thereof absorbed lights with wavelengths of 270 nm and 330 nm. FIG. 3 illustrates infrared spectra of the fluorescent carbon nanodots having positively charged amino groups on surfaces thereof, the carbon nanodot-polyacrylic acid composite hydrogel of EX1, the polyethyleneimine standard, the polyacrylic acid standard, and the polyethyleneimine/polyacrylic acid standard. As shown in FIG. 3, the fluorescent carbon nanodots having positively charged amino groups on surfaces thereof had a peak at 3420 $cm^{-1}$ attributed to N—H stretching vibrations and a peak at 1660 $cm^{-1}$ attributed to N—H bending vibrations. FIG. 4 is a HRTEM image showing the surface morphology of the fluorescent carbon nanodots having positively charged amino groups on surfaces thereof. As shown in FIG. 4, the fluorescent carbon nanodots having positively charged amino groups on surfaces thereof had an average particle size of 4.49±1.2 nm.

TABLE 1

| | pH of carbon nanodot-forming mixture | Zeta potential (mV) of fluorescent carbon nanodots with positively charged amino groups on surfaces thereof |
| --- | --- | --- |
| Centrifugated filtrate containing fluorescent carbon nanodots with positively charged amino groups on surfaces thereof | 3 | 1.41 |
| | 5 | 2.61 |
| | 7 | −1.67 |
| | 9 | −5.86 |
| | 11 | −9.57 |

As shown in Table 1, when the pH of the carbon nanodot-forming mixture for preparing the centrifugated filtrate increased from 5 to 7 or higher, the zeta potential of the fluorescent carbon nanodots having positively charged amino groups on surfaces thereof changed from a positive value to a negative value, indicating that in an acidic environment, the positively charged amino groups on the surfaces of the fluorescent carbon nanodots become uncharged amino groups as the pH value increases. Taken together, these results suggest that the fluorescent carbon nanodots having positively charged amino groups on surfaces thereof can be prepared by subjecting polyethylenimine and hydrochloric acid to a hydrothermal reaction.

Performance Evaluation

The carbon nanodot-polyacrylic acid composite hydrogels of EX1 to EX3 and the hydrogel-forming mixtures for preparing the same, the product-forming mixture for preparing the aqueous solution of carbon nanodots of CE1, and the product-forming mixture for preparing the liquid polyacrylic acid material of CE2 were subjected to the following performance evaluation.

1. Determination of Time for Onset of Gelation

During the polymerization reaction, each of the hydrogel-forming mixtures for preparing the carbon nanodot-polyacrylic acid composite hydrogels of EX1 to EX3 and the product-forming mixtures for preparing the aqueous solution of carbon nanodots of CE1 and the liquid polyacrylic acid material of CE2 was irradiated with a light having a wavelength of 600 nm, and the time upon a change in intensity of light absorbance was recorded. The results are shown in Table 2.

2. Determination of Self-Healing Ability (Recovery After Stretching)

A respective one of the carbon nanodot-polyacrylic acid composite hydrogels of EX1 to EX3 was placed on a universal/tensile testing machine (Manufacturer: Shimadzu Corporation; Model no: AG-ISMS IKN). Next, a tensile force of 10 mm/min was applied to stretch the carbon nanodot-polyacrylic acid composite hydrogel until breakage occurred, and the stretched length at break (L1) was recorded.

Then, a respective one of the carbon nanodot-polyacrylic acid composite hydrogels of EX1 to EX3 was cut into half to form two composite hydrogel portions each having a cut end. After that, the two composite hydrogel portions were arranged with the cut ends being stacked on each other, and were left to stand at 25° C. for 2 hours so as to form a test sample. Subsequently, the test sample was placed on the aforesaid universal/tensile testing machine, and a tensile force of 10 mm/min was applied to stretch the test sample until breakage occurred, followed by recording the stretched length at break (L2).

The recovery after stretching of the test sample was calculated using the following Equation (I):

Recovery after stretching (%)=(L2/L1)×100%    (I)

The results are shown in Table 2.

3. Determination of Antibacterial Characteristic

A sterilized agar medium was heated so as to obtain a melted agar medium, which was poured into two petri dishes each having a volume capacity of 15 mL. After solidification of the agar medium in the petri dishes, *Escherichia coli* and *Staphylococcus aureus* (obtained from Food Industry Research and Development Institute, Hsinchu, Taiwan) were respectively inoculated thereonto. Next, two Oxford cups each having an inner diameter of 6 mm, an outer diameter of 8 mm and a height of 10 mm were directly placed on the surface of the agar medium in the two petri dishes, respectively, so as to bring each of the Oxford cups into contact with the agar medium without gaps therebetween. Then, the carbon nanodot-polyacrylic acid composite hydrogel of EX1 was placed into each of the two Oxford cups, followed by incubation at 37° C. for 16 hours to 18 hours. The size of the zone of inhibition formed on the agar medium at peripheral region of each of the Oxford cups was measured using a ruler. The carbon nanodot-polyacrylic acid composite hydrogels of EX2 and EX3 were also subjected to the aforesaid experimental procedures. The results are shown in Table 2.

4. Measurement of Compressive Strength

A respective one of the carbon nanodot-polyacrylic acid composite hydrogels of EX1 to EX3 was placed on a universal/tensile testing machine (Manufacturer: Shimadzu Corporation; Model no: AG-IS), and was subjected to compression strength determination under a speed 10 mm/min. The measurement was stopped when the strain reached 90%, and the stress value when the strain was 75% was recorded. The results are shown in Table 2.

TABLE 2

| | | EX1 | EX2 | EX3 | CE1 | CE2 |
|---|---|---|---|---|---|---|
| Amount of fluorescent carbon nanodots having positively charged amino groups on surface (wt %) | | 1 | 2 | 3 | 0 | 0 |
| Amount of fluorescent carbon nanodots having amino groups and carboxyl groups on surface (wt %) | | 0 | 0 | 0 | 2 | 0 |
| Performance evaluation | Time for onset of gelation (second) | 90 | 60 | 60 | Unable to form hydrogel | Unable to form hydrogel |
| | Recovery after stretching (%) | 10 | 70 | 100 | — | — |
| | Zone of inhibition against *Escherichia coli* (cm) | 1.75 | 2.6 | 2.0 | — | — |
| | Zone of inhibition against *Staphylococcus aureus* (cm) | 1.65 | 2.5 | 2.0 | — | — |
| | Compressive strength (MPa) | 0.36 | 0.78 | 0.75 | — | — |

"—": not determined

As shown in Table 2, the time for onset of gelation during the polymerization reaction of the hydrogel-forming mixtures for preparing EX1 to EX3 ranged from 60 seconds to 90 seconds, and the hydrogel-forming mixtures were gradually transformed into the carbon nanodot-polyacrylic acid composite hydrogels. In contrast, the product-forming mixtures for preparing CE1 and CE2 were still in a form of a solution after the polymerization reaction proceeded for more than 300 seconds. These results indicate that the fluorescent carbon nanodots having positively charged amino groups on surfaces thereof facilitates formation of the carbon nanodot-polyacrylic acid composite hydrogel. In addition, the zones of inhibition against *Escherichia coli* and *Staphylococcus aureus* attributed to the carbon nanodot-polyacrylic acid composite hydrogels of EX1 to EX3 indicate that the carbon nanodot-polyacrylic acid composite hydrogel of the present disclosure has antibacterial properties.

Moreover, the recovery after stretching of the carbon nanodot-polyacrylic acid composite hydrogel of each of EX2 and EX3 showed that when the fluorescent carbon nanodots having amino groups on surfaces thereof were present in an amount ranging from 2 wt % to 3 wt %, the carbon nanodot-polyacrylic acid composite hydrogel, after being cut and recovering from the cutting, could recover the stretched length at break by 70% or greater compared to the stretched length at break of such composite hydrogel before being cut. This result suggests that when the fluorescent carbon nanodots having amino groups on surfaces thereof are present in an amount ranging from 2 wt % to 3 wt %, the carbon nanodot-polyacrylic acid composite hydrogel of the present disclosure, after being damaged, is capable of self-healing.

In summary, by virtue of including the fluorescent carbon nanodots having amino groups on surfaces thereof, the carbon nanodot-polyacrylic acid composite hydrogel of the present disclosure is conferred with an ability to rapidly begin gelation, and antibacterial properties.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A carbon nanodot-polyacrylic acid composite hydrogel, comprising:
   a polyacrylic acid-based gel matrix having carboxyl groups; and
   a plurality of fluorescent carbon nanodots having amino groups on surfaces thereof,
   wherein the fluorescent carbon nanodots are formed by subjecting polyethylenimine and hydrochloric acid to a hydrothermal reaction, and are distributed in the polyacrylic acid-based gel matrix, the amino groups of the fluorescent carbon nanodots being covalently bonded with the carboxyl groups of the polyacrylic acid-based gel matrix.

2. The carbon nanodot-polyacrylic acid composite hydrogel as claimed in claim 1, wherein the fluorescent carbon nanodots are present in an amount ranging from 2 wt % to 3 wt % based on a total weight of the carbon nanodot-polyacrylic acid composite hydrogel.

3. The carbon nanodot-polyacrylic acid composite hydrogel as claimed in claim 1, wherein the polyacrylic acid-based gel matrix is formed by subjecting acrylic acid and an initiator to a polymerization reaction.

4. The carbon nanodot-polyacrylic acid composite hydrogel as claimed in claim 3, wherein the polymerization reaction is performed at a temperature ranging from 25° C. to 60° C. for a time period ranging from 5 minutes to 2 hours.

5. The carbon nanodot-polyacrylic acid composite hydrogel as claimed in claim 1, wherein the hydrothermal reaction is performed at a temperature ranging from 220° C. to 260° C. for a time period ranging from 8 hours to 12 hours.

6. A method for preparing a carbon nanodot-polyacrylic acid composite hydrogel, comprising:
   mixing a plurality of fluorescent carbon nanodots having positively charged amino groups on surfaces thereof with acrylic acid and an initiator so as to form a hydrogel-forming mixture; and
   subjecting the hydrogel-forming mixture to a polymerization reaction,
   wherein the fluorescent carbon nanodots are formed by subjecting polyethylenimine and hydrochloric acid to a hydrothermal reaction.

7. The method as claimed in claim 6, wherein the polymerization reaction is performed at a temperature ranging from 25° C. to 60° C. for a time period ranging from 5 minutes to 2 hours.

8. The method as claimed in claim 6, wherein the hydrothermal reaction is performed at a temperature ranging from 220° C. to 260° C. for a time period ranging from 8 hours to 12 hours.

9. A formulation for forming a carbon nanodot-polyacrylic acid composite hydrogel, comprising:
   a plurality of fluorescent carbon nanodots having positively charged amino groups on surfaces thereof;
   acrylic acid; and
   an initiator,
   wherein the fluorescent carbon nanodots are formed by subjecting polyethylenimine and hydrochloric acid to a hydrothermal reaction.

* * * * *